United States Patent
Li et al.

(10) Patent No.: US 7,637,672 B1
(45) Date of Patent: Dec. 29, 2009

(54) PLUGGABLE OPTICAL TRANCEIVER MODULE HAVING EFFECTIVE THERMAL RELEASE FUNCTION

(75) Inventors: Wen Li, Fremont, CA (US); Wen Huang, Cupertino, CA (US); Fulin Pan, Fremont, CA (US)

(73) Assignee: Broadway Networks, Ltd., San Jose, CA (US)

( * ) Notice: Subject to any disclaimer, the term of this patent is extended or adjusted under 35 U.S.C. 154(b) by 0 days.

(21) Appl. No.: 12/263,503

(22) Filed: Nov. 2, 2008

(51) Int. Cl.
*G02B 6/36* (2006.01)
*H04B 10/00* (2006.01)
*G02B 6/42* (2006.01)

(52) U.S. Cl. .................................. 385/92; 398/139
(58) Field of Classification Search ............. 385/88–92; 398/135, 139
See application file for complete search history.

(56) References Cited

U.S. PATENT DOCUMENTS

| | | | |
|---|---|---|---|
| 6,430,053 B1 | 8/2002 | Peterson | |
| 6,502,998 B2 | 1/2003 | Yen | |
| 7,048,451 B2 * | 5/2006 | Lo et al. | 385/92 |
| 7,153,043 B1 | 12/2006 | Zhang | |
| 2003/0027440 A1 | 2/2003 | Birch | |
| 2003/0049000 A1 | 3/2003 | Wu | |
| 2004/0161207 A1 | 8/2004 | Chiu | |

\* cited by examiner

*Primary Examiner*—Frank G Font
*Assistant Examiner*—Michael P Mooney
(74) *Attorney, Agent, or Firm*—Xin Wen

(57) ABSTRACT

A pluggable optical transceiver includes a housing member comprising an extended portion to be plugged into a host device and an outer housing member to protrude out of the host device. An optical module mounted to the housing member can be coupled to an optical fiber. A circuit board is mounted to the housing member and electrically coupled to the optical module. The circuit board includes an electronic circuit and an electric interface configured to be electrically connected to the host device. The electric circuit is in thermal conductive communication with the extended portion to conduct heat from the electric circuit.

26 Claims, 13 Drawing Sheets though the upper cover 120 is mounted on the lower housing member. When enclosed, an air gap exists between the upper cover 120 and the upper electric circuit board 130A. The electric circuit board 130B includes an electric interface 135 that is configured to communicate with the electric interface in the cage 230. The electric interface 135 and the electric interface in the cage 230 can be defined by a standard for pluggable optical transceivers such as Small Form-factor Pluggable (SFP) and Transceiver Multi-Source Agreement (MSA). An optical module 140 mounted to the electric circuit board 130B includes an optical interface 145 configured to be coupled to an optical fiber for receiving or transmitting optical signals to a remote device.

PLUGGABLE OPTICAL TRANCEIVER MODULE HAVING EFFECTIVE THERMAL RELEASE FUNCTION

BACKGROUND

The present disclosure relates to optical transceiver that is pluggable into a host device for optical communications.

Pluggable optical transceivers are widely used for data transmission in fiber optical communications. A pluggable optical transceiver can receive electric signals containing encoded data, convert the electric signals into optical signals, and transmit the optical signals through an optical data link. The pluggable optical transceiver can also receive optical signals containing encoded data, convert the optical signals into electric signals, and transmit the electric signals to a host device via an electrical interface. The electric interface and dimensions of pluggable optical transceivers can be defined by various device standards such as Small Form-factor Pluggable (SFP).

Referring to FIGS. 1A-1C, a host device 200 includes a chassis 210, and a circuit board 220 and a cage 230 mounted on the chassis 210. A conventional pluggable optical transceiver 100 is plugged into the cage 230. The cage 230 includes an electric interface (not shown) that is configured for transmitting data-carrying electric signals between the circuit board 220 and a remote device.

Referring to FIGS. 1A-4, a conventional pluggable optical transceiver 100 includes a lower housing member 110, an upper cover 120, and one or more interconnected electric circuit boards 130A and 130B. The lower housing member 110 includes an outer portion 115 and a lower portion 118. When the pluggable optical transceiver 100 is plugged into the cage 230, the outer portion 115 and, optionally, part of the lower portion 118, extend outside of the chassis 210.

The electric circuit boards 130A and 130B can be arranged in a stack and mounted to the lower housing member 110. The electric circuit boards 130A and 130B are can be enclosed by the upper cover 120 and the lower housing member 110 when A major challenge for some conventional pluggable optical transceivers is associated with the heating generated by the electric circuits during operations. As increasing system functions are integrated into a pluggable transceiver module, more heat is generated by the electronic components on the circuit boards. Since during the operation a pluggable optical transceiver may be plugged into a cage without air circulation, temperature of the electric circuit board can be elevated to such high level to cause malfunction in the pluggable optical transceiver. There is therefore a need for a pluggable optical transceiver that can provide appropriate data communication functions without the above described overheating problems.

SUMMARY

In a general aspect, the present specification relates to a pluggable optical transceiver that includes a housing member comprising an extended portion that can be plugged into a host device and an outer housing member that can protrude out of the host device; an optical module mounted to the housing member and configured to be coupled to an optical fiber, wherein the optical module can receive a first optical signal from the optical fiber and transmit a second optical signal to the optical fiber in response to a first electric signal; and one or more circuit boards mounted to the housing member and electrically coupled to the optical module, the one or more circuit boards comprising an electronic circuit and an electric interface that can be electrically connected to the host device, wherein the electric circuit can receive the first electric signal from the host device via the electric interface, wherein the electric circuit can send a second electric signal to host device via the electric interface in response to the first optical signal, wherein at least a portion of the electric circuit is in thermal conductive communication with the extended portion to conduct heat from the electric circuit.

In another general aspect, the present specification relates to a pluggable optical transceiver that includes a housing member comprising an extended portion that can be plugged into a host device and an outer housing member that can protrude out of the host device, wherein the housing member is formed by a unitary component; an optical module mounted to the housing member and that can be coupled to an optical fiber, wherein the optical module can receive a first optical signal from the optical fiber and transmit a second optical signal to the optical fiber in response to a first electric signal; one or more circuit boards mounted to the housing member and electrically coupled to the optical module, the one or more circuit boards comprising an electronic circuit and an electric interface that can be electrically connected to the host device, wherein the electric circuit can receive the first electric signal from the host device via the electric interface, wherein the electric circuit can send a second electric signal to host device via the electric interface in response to the first optical signal; and a thermal conductive layer positioned in contact with at least a portion of the electric circuit and the extended portion, wherein the thermal conductive layer can conduct heat from the electric circuit to the extended portion.

In yet another general aspect, the present specification relates to a pluggable optical transceiver that includes a housing member comprising an extended portion that can be plugged into a host device and an outer housing member that can protrude out of the host device, wherein the housing member is formed by a unitary component, wherein the outer portion of the housing member comprises protrusions or fins that can dissipate heat conducted from the electric circuit into surrounding air; an optical module mounted to the housing member and configured to be coupled to an optical fiber, wherein the optical module can receive a first optical signal from the optical fiber and transmit a second optical signal to the optical fiber in response to a first electric signal; one or more circuit boards mounted to the housing member and electrically coupled to the optical module, the one or more circuit boards comprising an electronic circuit and an electric interface that can be electrically connected to the host device, wherein the electric circuit can receive the first electric signal from the host device via the electric interface, wherein the electric circuit can send a second electric signal to host device via the electric interface in response to the first optical signal, wherein the electric circuit comprises a heat-generating electronic component; and a thermal conductive layer positioned in contact with the heat-generating electronic component of the electric circuit and the extended portion, wherein the thermal conductive layer can conduct heat from the electric circuit to the extended portion.

Implementations of the system may include one or more of the following. The pluggable optical transceiver can further include a thermal conductive layer positioned between at least the portion of the electric circuit and the extended portion of the housing member. The one or more circuit boards can include an electronic component that can generate heat in operation, the pluggable optical transceiver further comprising a thermal conductive layer on the electronic component and in contact with the extended portion of the housing member. The thermal conductive layer can be formed by a thermally conductive adhesive material or a thermal conductive tape. The electronic component can include an integrated circuit (IC). The housing member can be formed by a metallic material and a conductive polymer. The housing member can be formed by a unitary component. The extended portion and the outer portion of the housing member can be in thermal conductive contact to allow heat conduction from the electric circuit to the outer portion. The outer portion of the housing member can include protrusions or fins that can dissipate heat conducted from the electric circuit into surrounding air. The pluggable optical transceiver can further include a cover that can be mounted on the housing member to enclose at least portions of the one or more circuit boards, wherein the cover can be at least partially plugged into the host device. The extended portion of the housing member can be plugged into a cage in the host device, wherein the cover comprises protruded areas that can come into contact with the cage to dissipate heat from the electric circuit to the host device. The electric interface, one or more dimensions of the housing member and the cover can be in compliance with a standard selected from the group consisting of Small Form Factor (SFF), Transceiver Multi-Source Agreement (MSA), Small Form-factor Pluggable (SFP), and Bi-directional Small Form-factor Pluggable (Bi-direction SFP). The one or more circuit boards can include a printed circuit board (PCB). The one or more circuit boards can include two PCBs connected by a flexible PCB. The housing member can be formed by Zinc die cast. The extended portion in the housing member can include a wall having a thickness at least 1 mm to conduct heat from the electric circuit.

Embodiments may include one or more of the following advantages. The present disclosure can provide efficient heat dissipation for pluggable optical transceivers. The disclosed systems and methods are suitable for pluggable optical transceivers a wide range of pluggable transceiver standards. The disclosed systems and methods are especially suitable for pluggable transceivers having highly integrated electronic functions and high rate of heat generation.

Although the specification has been particularly shown and described with reference to multiple embodiments, it will be understood by persons skilled in the relevant art that various changes in form and details can be made therein without departing from the spirit and scope of the specification.

DETAILED DESCRIPTION

Figure 1A:
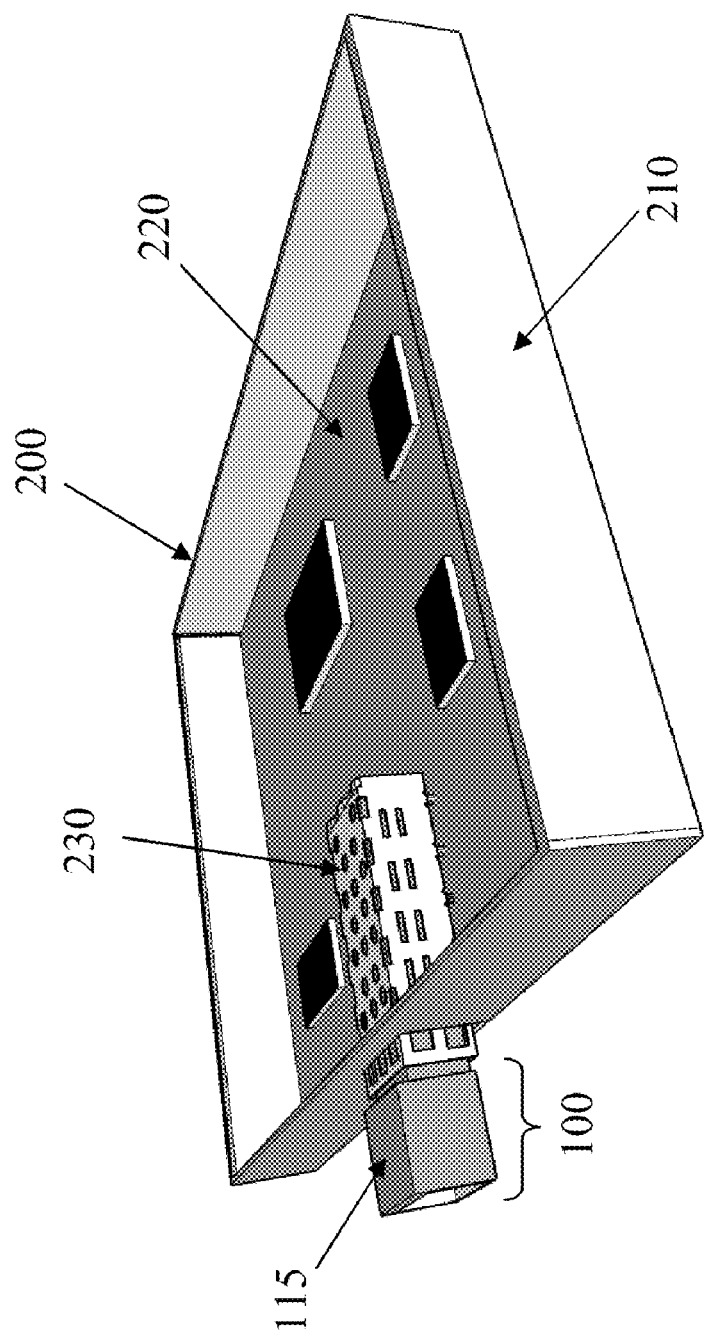
FIG. 1A is a perspective view of a conventional pluggable optical transceiver plugged into a host device for optical communication.
Figure 1B:
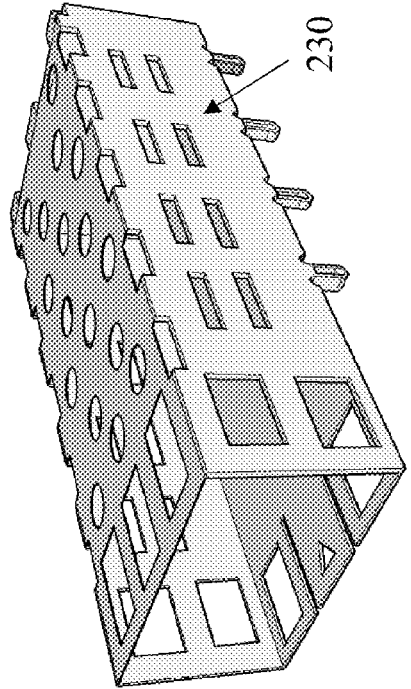
FIG. 1B is a perspective view of a cage in the host device for receiving the conventional pluggable optical transceiver in FIG. 1A.
Figure 1C:
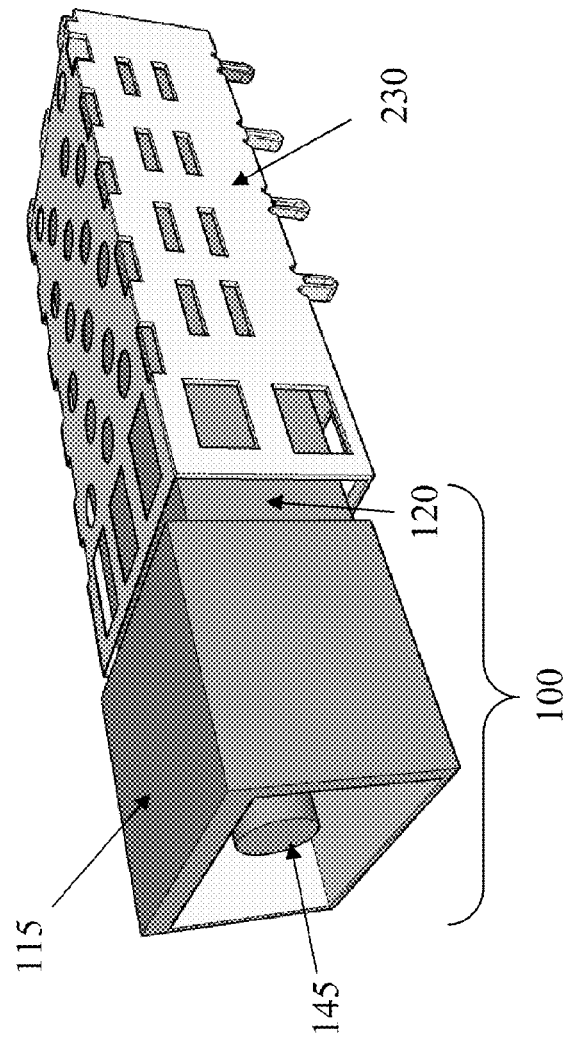
FIG. 1C is a perspective view illustrating the conventional pluggable optical transceiver in FIG. 1A plugged into the cage in the host device (not shown for clarity of viewing).
Figure 2:
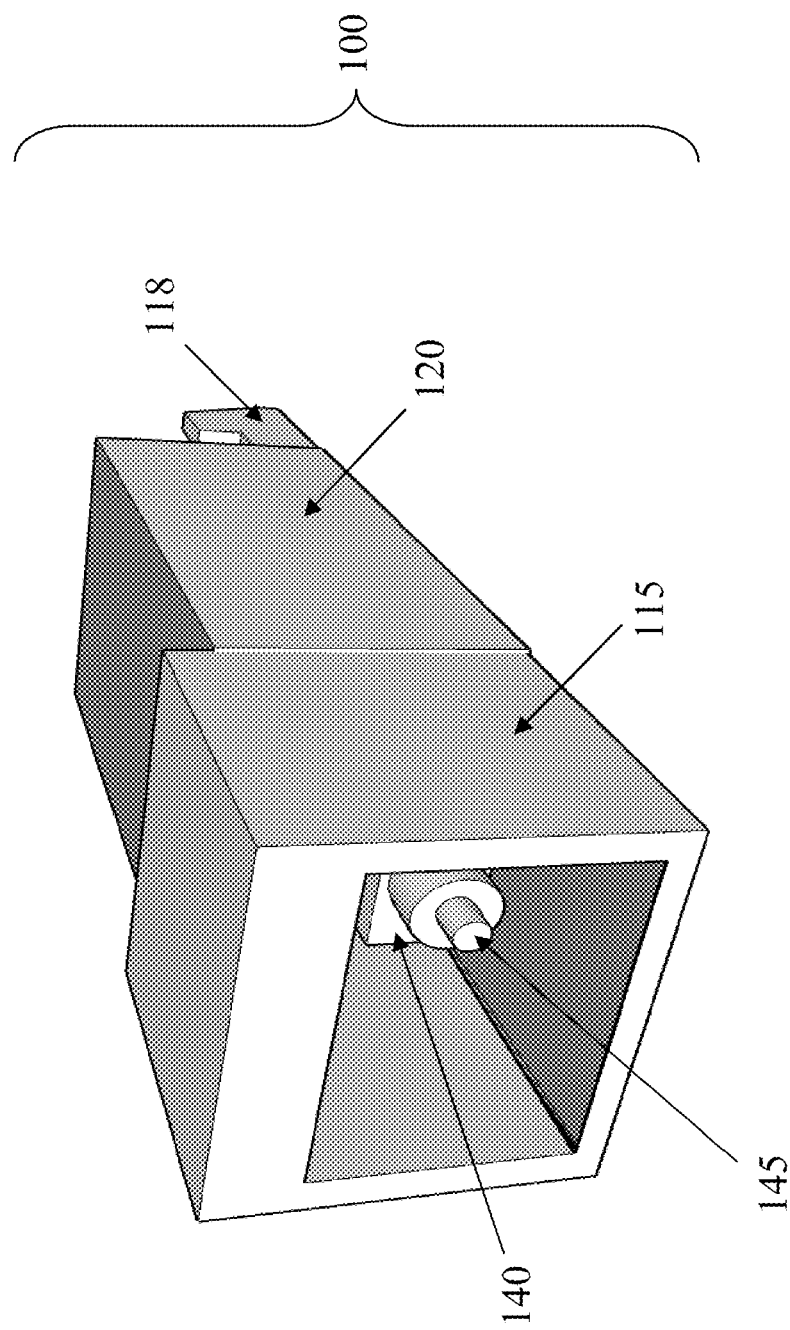
FIG. 2 is a front perspective view of the conventional pluggable optical transceiver in FIG. 1A.
Figure 3:
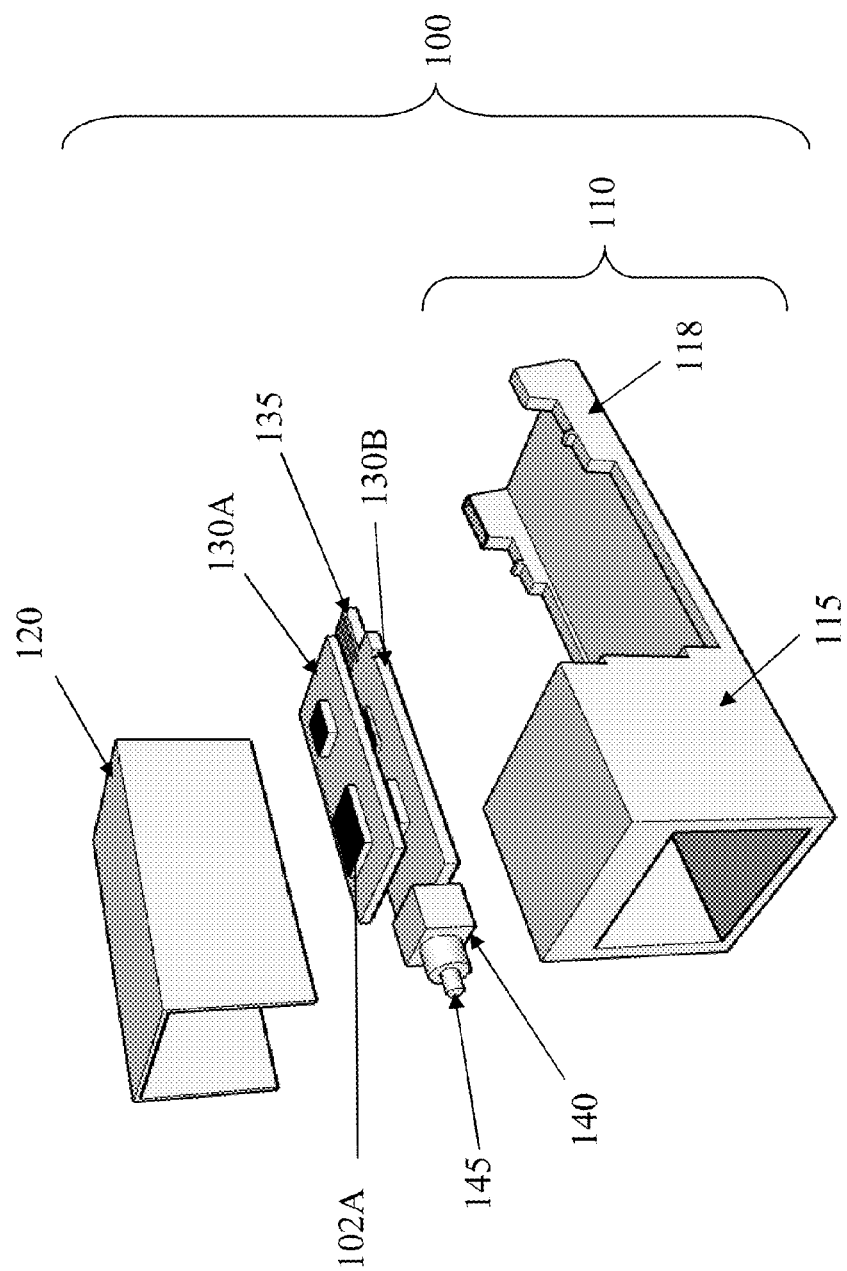
FIG. 3 is an exploded perspective view of the conventional pluggable optical transceiver in FIG. 1A.
Figure 4:
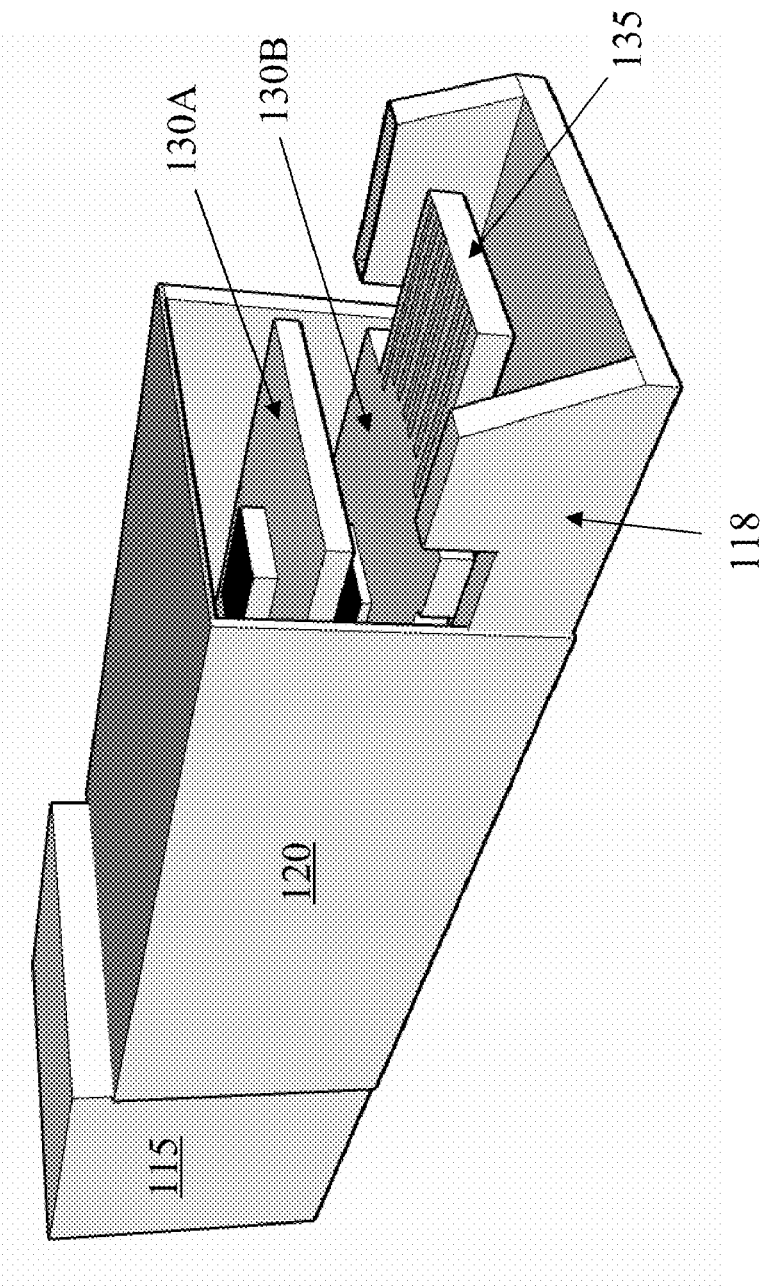
FIG. 4 is a rear perspective view of the conventional pluggable optical transceiver in FIG. 1A.

Referring to FIGS. 5A-5D, a pluggable optical transceiver 500 includes an upper housing member 510, a lower cover 520, and one or more interconnected electric circuit boards 530A and 530B. The upper housing member 510 includes an outer portion 515 and an extended portion 518. When the pluggable optical transceiver 500 is plugged into the cage 230, the outer portion 515 and, optionally, part of the extended portion 518, extend outside of the chassis 210. The dimensions of the pluggable optical transceiver 500 can be defined by a standard for pluggable optical transceivers such as SFP and multi-source agreement (MSA).

The electric circuit boards 530A and 530B and electronic components thereon can be implemented by printed circuit board (PCB), lead frame, and other electronic packaging technologies. The electric circuit boards 530A and 530B can be connected by a flexible PCB which allows electronic communications between the circuits in electric circuit boards 530A and 530B.

The electric circuit boards 530A and 530B are mounted to the upper housing member 510. The electric circuit boards 530A and 530B can be enclosed by the lower cover 520 and the upper housing member 510 when the lower cover 520 is mounted on the lower housing member. The upper electric circuit board 530A can include electronic components 537 such as integrated circuit (IC) modules that generate much of the heat in operation. The electric circuit board 530B includes an electric interface 535 that is configured to communicate with the electric interface in the cage 230. The electric interface 535 and the electric interface in the cage 230 can be defined by a standard for pluggable optical transceivers such as Small Form-factor Pluggable (SFP) and Transceiver Multi-Source Agreement (MSA). An optical module 540 mounted to the electric circuit board 530B includes an optical interface 545 configured to be coupled to an optical fiber for receiving or transmitting optical signals to a remote device.

The pluggable optical transceiver 500 often has an elongated form factor with the optical module 540 positioned at a first end (or outer end) and the electric interface 535 positioned at a second end (or inner end) to be plugged into a cage 230 in a host device.

The electric circuit boards 530A and 530B can receive electric signals containing encoded data from the host device 200 via the electric interface 535. The optical module 540 includes an optical transmitter (e.g. a laser diode) that can convert the electric signals into optical signals, which can be transmitted to a remote device via an optical fiber coupled to the optical interface 545. The optical module 540 can also receive optical signals containing encoded data from a remote device at the optical interface 545. The optical module 540 can convert the optical signals into electric signals, which can be processed by the electric circuit boards 530A and 530B before being sent to the host device 200 via the electrical interface 535.

The upper housing member 510 is formed by a thermally conductive material such as metallic materials and conductive polymers, which can be formed using Zinc die cast. The outer portion 515 and the extended portion 518 in the upper housing member 510 can be formed by a unitary component or welded together to assure excellent thermal conductive communication between the outer portion 515 and the extended portion 518. The thickness of the extended portion 518 can be made to 1 mm or thicker to assure proper thermal conduction.

In the present specification, the term "thermal conduction" or "heat conduction" refers to the transfer of heat energy from one material to another by direct physical contact. In the present specification, "thermal conduction" describes heat transfer between physical objects that are in contact, but does not include heat transfer through air (or air gap).

Figure 5A:
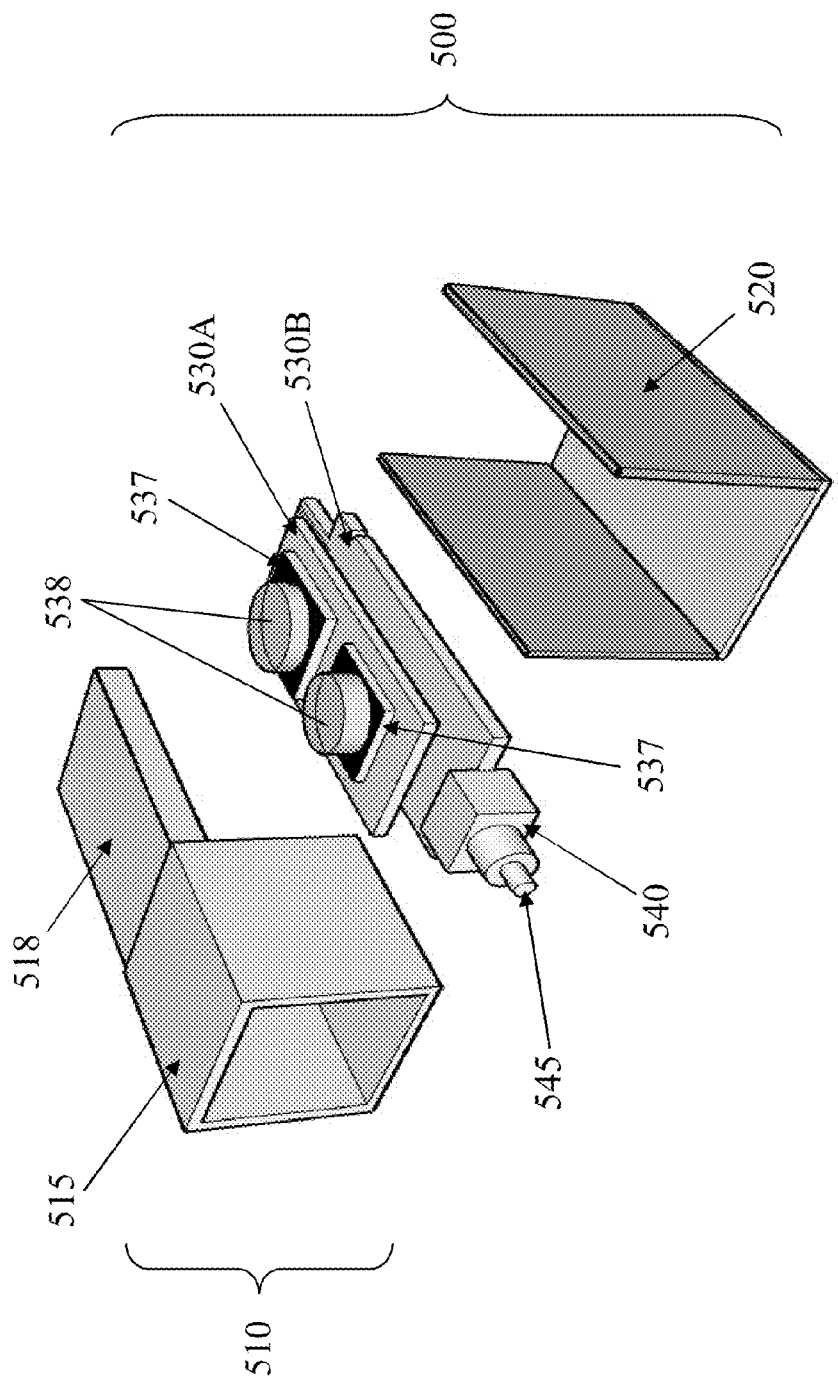
FIG. 5A is an exploded perspective view of an exemplified pluggable optical transceiver in accordance with the present specification.
Figure 5B:
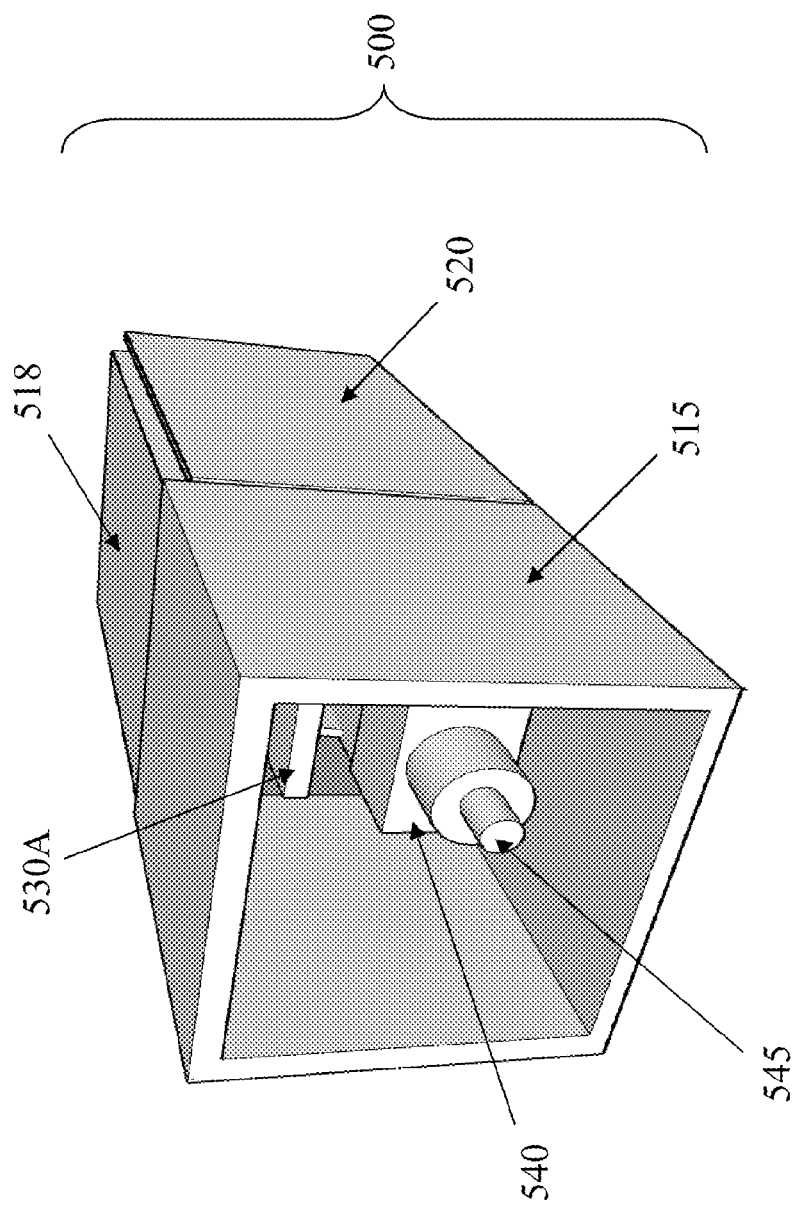
FIG. 5B is a front perspective view of the pluggable optical transceiver of FIG. 5A.
Figure 5C:
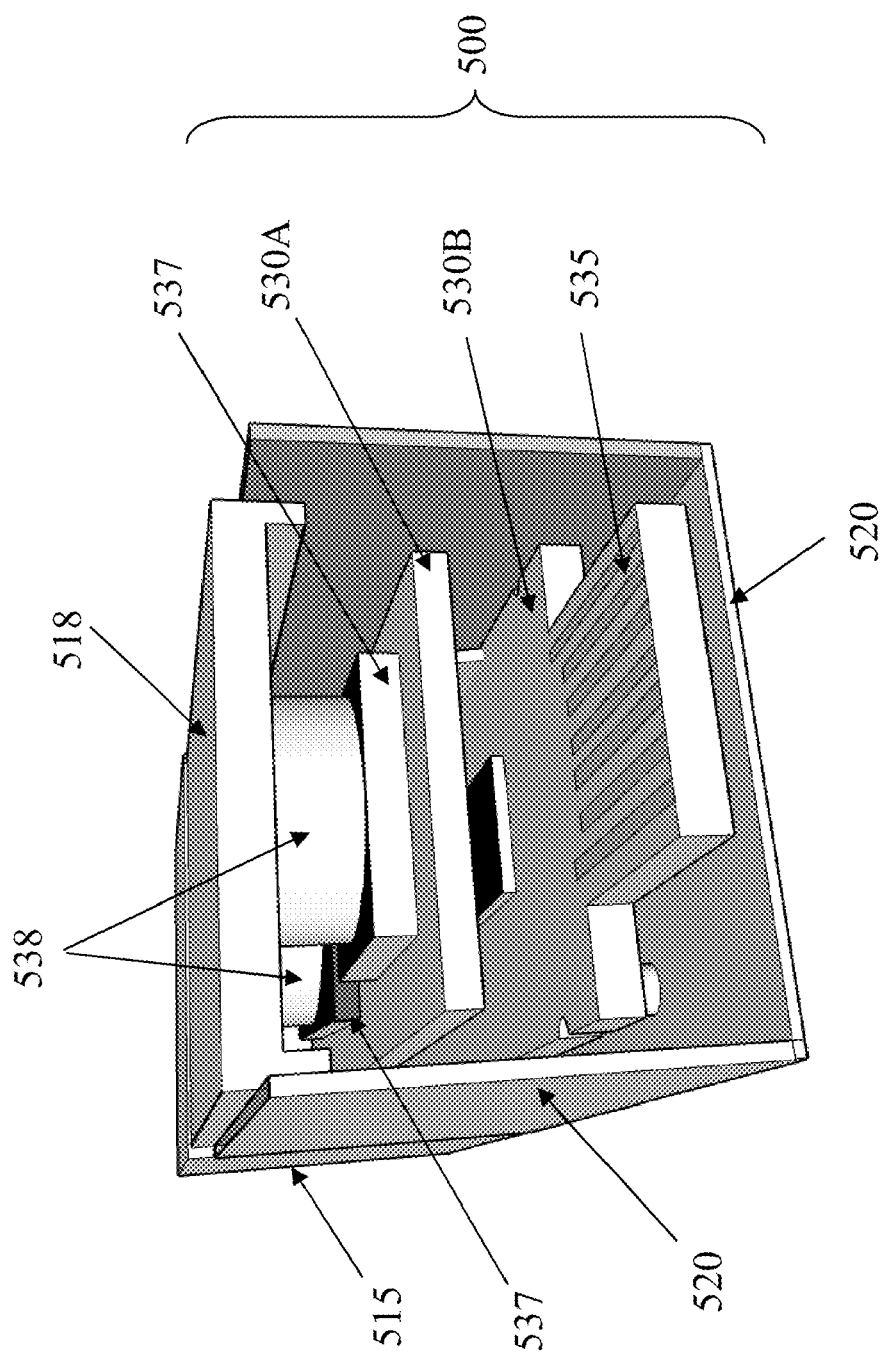
FIG. 5C is a rear perspective view of the pluggable optical transceiver of FIG. 5A.
Figure 5D:
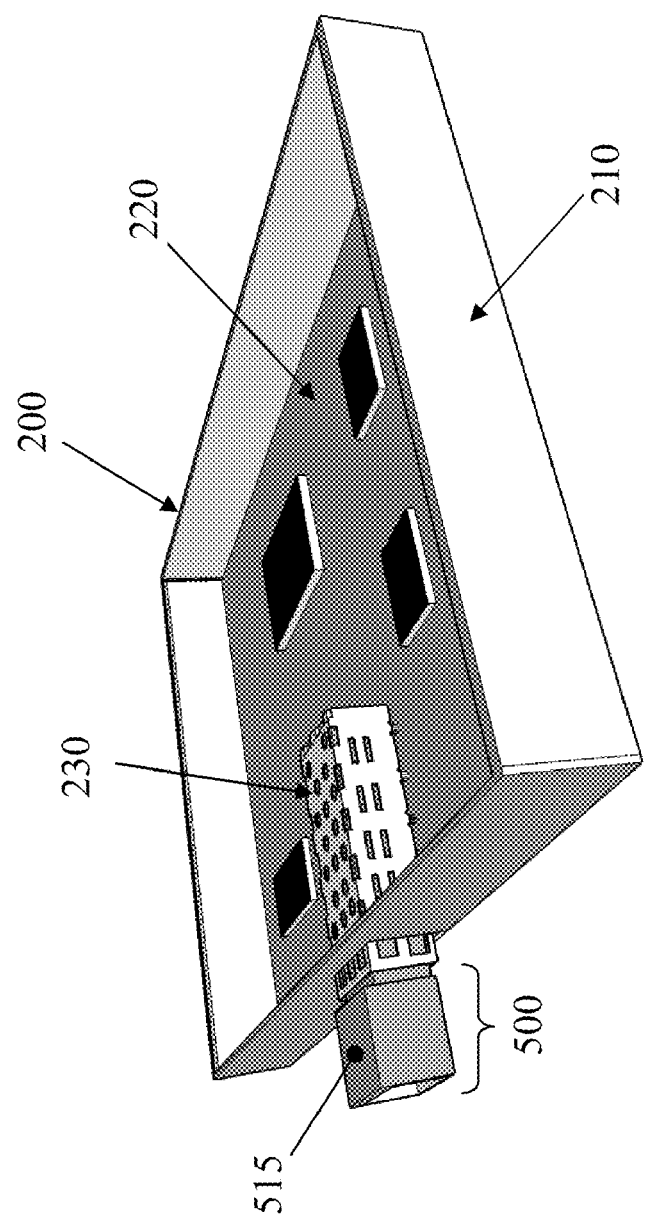
FIG. 5D is a perspective view illustrating the pluggable optical transceiver of FIG. 5A plugged into a host device.

The electric circuit boards 530A and 530B, referring to FIGS. 5A and 5C, can include significant heat-generating electronic components 537 such as integrated circuit (IC) modules. The electronic components 537 are positioned facing the extended portion 518 when the electric circuit boards 530A and 530B are mounted onto the upper housing member 510. Thermal conductive layers 538 are formed on the electronic components 537 and in contact with the extended portion 518. The thermal conductive layers 538 can allow heat generated by the electronic components 537 during operation to be effectively conducted to the extended portion 518 and then the outer portion 515. The heat can subsequently be dissipated to the ambient environment because the outer portion 515 is extended outside of the chassis when the pluggable optical transceiver 500 is plugged into the cage 230.

The thermal contact layer 538 between the thermal conductive layers 538 and the extended portion 518 or the electronic components 537 can be enforced by spring loaded clamp or level. In some embodiments, a thermally conductive adhesive material or thermal conductive tape can be applied on the electronic components 537 to form the thermal contact layer 538. An example for the thermally conductive adhesive includes a conductive polymeric adhesive material such as Dow Corning® 1-4173 Thermally Conductive Adhesive. An example for the thermal conductive tape is 3M™ 3M 8805 Thermally Conductive Transfer Tape. The thermally conductive adhesive or tape can be bonded to both the electronic components 537 and the extended portion 518 when the electric circuit boards 530A and 530B are mounted onto the upper housing member 510. It should be understood that thermal conductive contact can be established between the extended portion 518 and other heat dissipating electronic components such as amplifiers, resistors, and capacitors in the electric circuit boards 530A and 530B.

An advantage of the disclosed pluggable optical transceiver is that it provides effective and direct thermal conduction from heat-generating electronic components on the circuit boards to a component that is outside of the chassis of the host device. Heat conduction and dissipation is significantly improved comparing to conventional pluggable optical transceivers as previously described. The conventional pluggable optical transceivers do not have direct thermal contact between an upper cover and electronic components on the electric circuits. Furthermore, the upper cover typically does not have good thermal communication with the outer portion in the lower housing member because they are typically snapped together and thus do not have large and reliable thermal contact areas.

In one aspect, the positions of the extended portion in the housing member and the cover are flipped from below to above the electric circuit board in the disclosed pluggable optical transceiver in comparison with some conventional pluggable optical transceivers. In another aspect, the housing member is made thermal conductive and is positioned to be in direct thermal contact with heat dissipating components on the electric circuit board in the disclosed pluggable optical transceiver. The disclosed system is compatible with other configurations.

In some embodiments, the housing member, the cover, and the one or more electric circuit boards can be oriented upside down from the configurations illustrated in FIGS. 5A-5D as long as good thermal contact is maintained between the thermally conductive housing member and heat dissipating components on the electric circuit board and the electric interface is compatible with the electric interface in the cage.

Figure 6A:
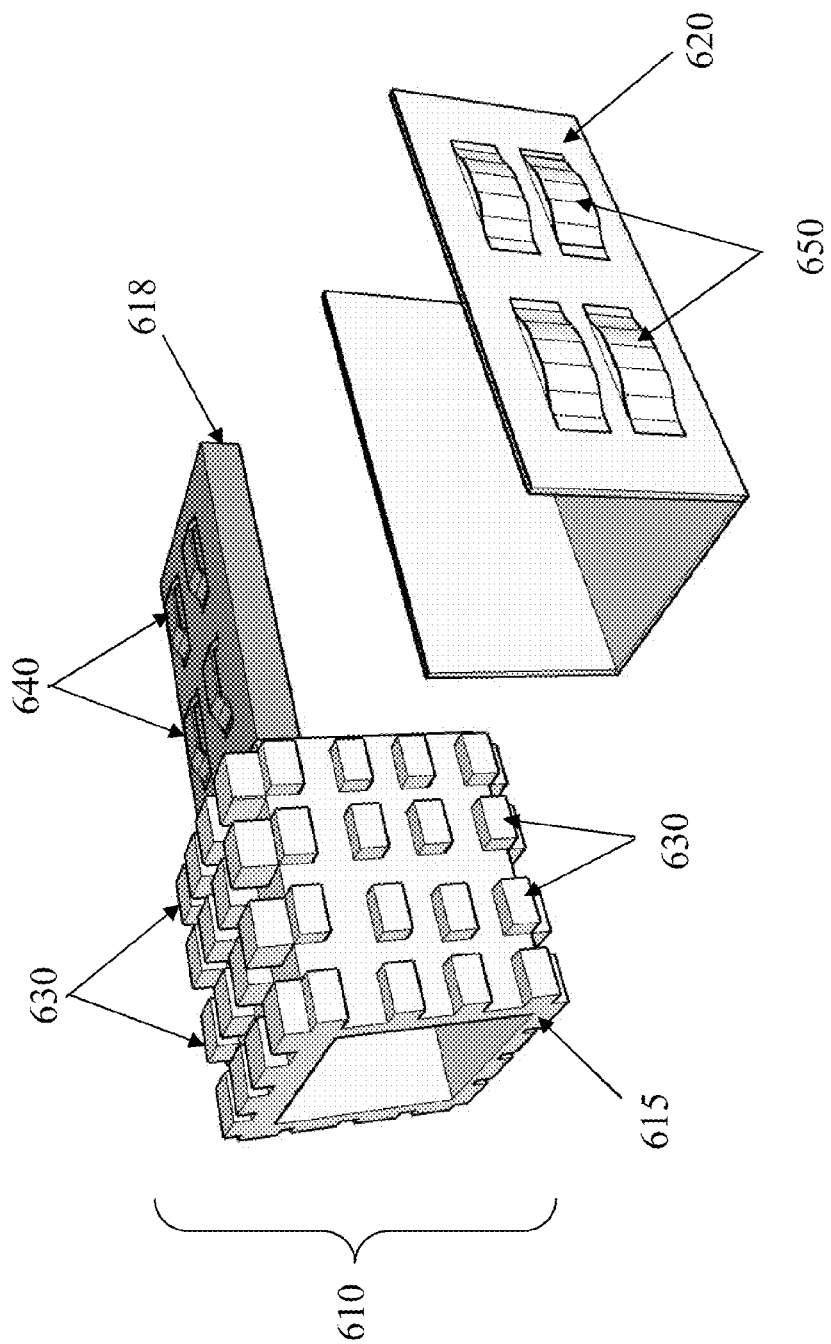
FIG. 6A is an exploded perspective view of an exemplified housing member and a cover suitable for the pluggable optical transceivers in accordance with the present specification.
Figure 6B:
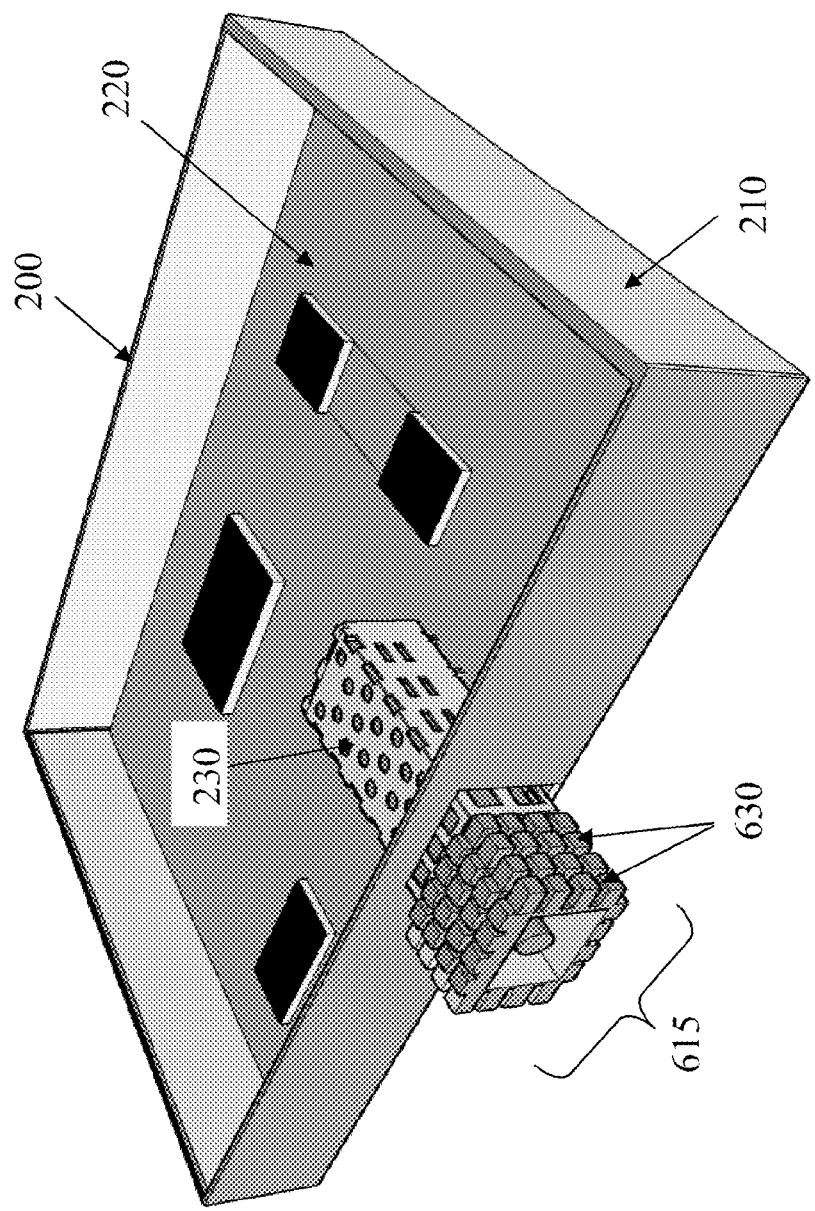
FIG. 6B is a perspective view illustrating the pluggable optical transceiver of FIG. 6A plugged into a host device.

In some embodiments, referring to FIGS. 6A and 6B, an upper housing member 610 includes an outer portion 615 and an extended portion 618. The outer portion 615 includes, on its surfaces, a plurality of protrusions 630 that can increase the surface area and the volume of surrounding air around the outer portion 615 outside of the chassis 210 of the host device 200. Cooling efficiency of the disclosed pluggable optical transceiver can thus be increased. The protrusions 630 can exist in different forms such as cooling blades or cooling fins. The protrusions 630 can also be made at different density and with different height distribution to maximize cooling efficiency of the outer portion 615.

Moreover, the extended portion 618 can include protruded areas 640 that can come to contact with the cage 230 when the extended portion 618 is plugged into the cage 230. In some embodiments, the protruded areas 640 can be implemented by spring loaded thermally conductive plates that can be pressed against the cage 230 when the extended portion 618 is plugged into the cage 230. The thermal contact between the extended portion 618 and the cage 230 provides an additional thermal conduction and dissipation path for the heat generated by the electric circuit boards.

Figure 7:
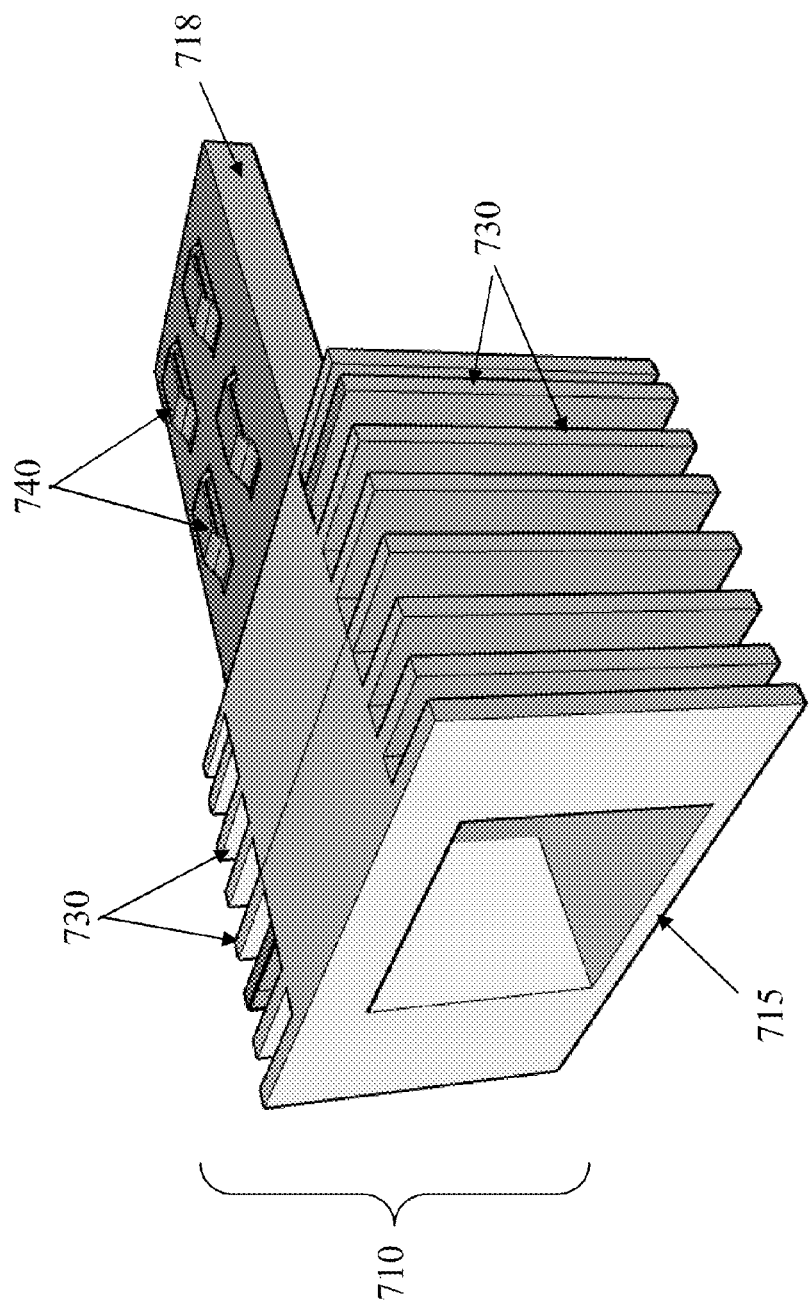
FIGS. 7 and 8 are exploded perspective views of other exemplified housing members suitable for the disclosed pluggable optical transceivers in accordance with the present specification.

In some embodiments, referring to FIG. 7, an upper housing member 710 includes an outer portion 715 and an extended portion 718. The outer portion 715 includes, on its surfaces, a plurality of cooling fins 730 that can increase cooling efficiency of the disclosed pluggable optical transceiver. The extended portion 718 includes protruded areas 740 that can come to contact with the cage 230 when the extended portion 718 is plugged into the cage 230, which provides additional thermal conduction and dissipation path for the heat generated by the electric circuit boards.

Figure 8:
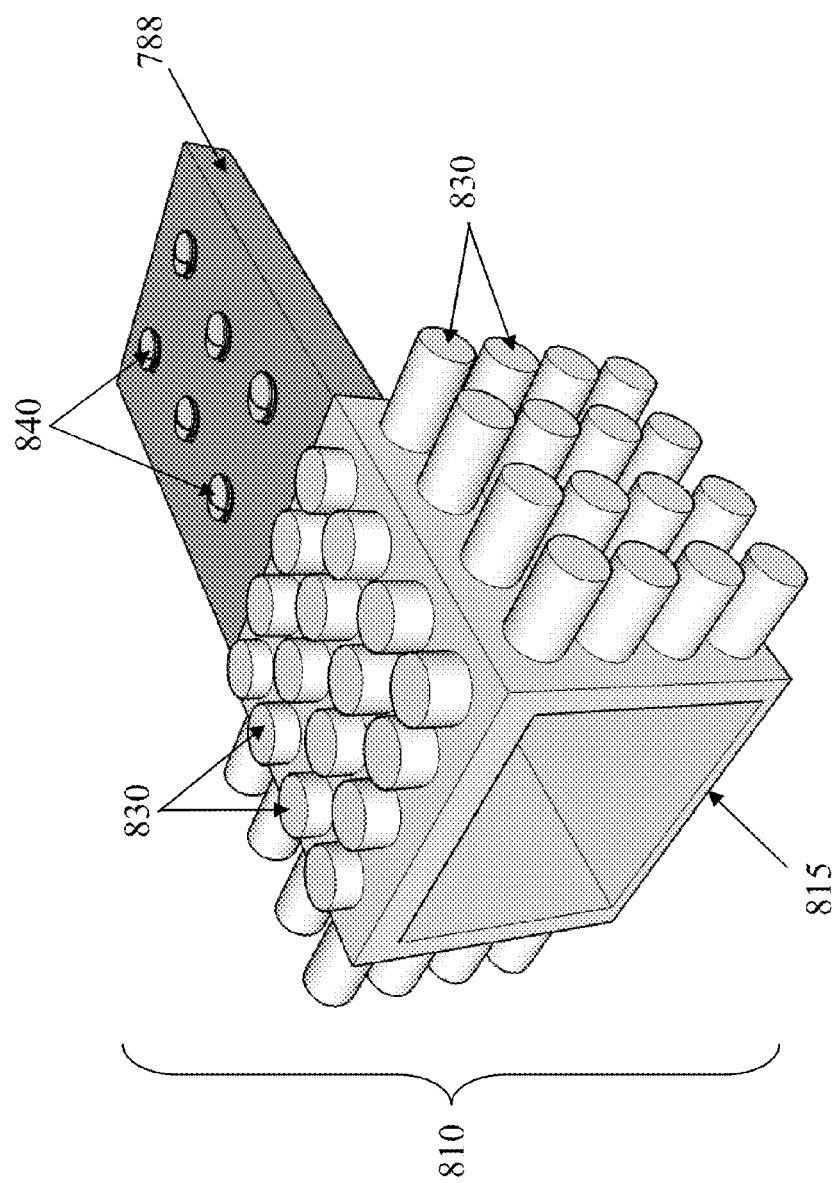

In some embodiments, referring to FIG. 8, an upper housing member 810 includes an outer portion 815 and an extended portion 818. The outer portion 815 includes, on its surfaces, a plurality of cooling columns 830 that are protruded out of the outer surface. The cooling columns 830 can increase cooling efficiency of the disclosed pluggable optical transceiver. The extended portion 818 includes protruded areas 840 that can come to contact with the cage 230 when the extended portion 818 is plugged into the cage 230, which provides additional thermal conduction and dissipation path for the heat generated by the electric circuit boards.

It is understood that the specific configurations and parameters described above are meant to illustrate the concept of the specification. The disclosed systems and methods can be compatible with variations of configurations and parameters without deviating from the spirit of the present invention. For example, the disclosed pluggable optical transceiver is compatible with industry standards such as Small Form Factor (SFF), Small Form-factor Pluggable (SFP), Bi-directional Small Form-factor Pluggable (Bi-direction SFP), and other standards for optical transceiver modules. The disclosed systems and methods are compatible with point-to-point optical networks and point-to-multi-point optical networks.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A pluggable optical transceiver, comprising:
   a housing member comprising an extended portion configured to be plugged into a host device and an outer housing member configured to protrude out of the host device;
   an optical module mounted to the housing member and configured to be coupled to an optical fiber, wherein the optical module is configured to receive a first optical signal from the optical fiber and transmit a second optical signal to the optical fiber in response to a first electric signal; and
   one or more circuit boards mounted to the housing member and electrically coupled to the optical module, the one or more circuit boards comprising an electronic circuit and an electric interface configured to be electrically connected to the host device, wherein the electric circuit is configured to receive the first electric signal from the host device via the electric interface, wherein the electric circuit is configured to send a second electric signal to host device via the electric interface in response to the first optical signal, wherein at least a portion of the electric circuit is in thermal conductive communication with the extended portion to conduct heat from the electric circuit.

2. The pluggable optical transceiver of claim 1, further comprising a thermal conductive layer positioned between at least the portion of the electric circuit and the extended portion of the housing member.

3. The pluggable optical transceiver of claim 1, wherein the one or more circuit boards comprise an electronic component configured to generate heat in operation, the pluggable optical transceiver further comprising a thermal conductive layer on the electronic component and in contact with the extended portion of the housing member.

4. The pluggable optical transceiver of claim 3, wherein the thermal conductive layer is formed by a thermally conductive adhesive material or a thermal conductive tape.

5. The pluggable optical transceiver of claim 3, wherein the electronic component includes an integrated circuit (IC).

6. The pluggable optical transceiver of claim 1, wherein the housing member is formed by a metallic material and a conductive polymer.

7. The pluggable optical transceiver of claim 1, wherein the housing member is formed by a unitary component.

8. The pluggable optical transceiver of claim 1, wherein the extended portion and the outer portion of the housing member are in thermal conductive contact to allow heat conduction from the electric circuit to the outer portion.

9. The pluggable optical transceiver of claim 1, wherein the outer portion of the housing member comprises protrusions or fins configured to dissipate heat conducted from the electric circuit into surrounding air.

10. The pluggable optical transceiver of claim 1, further comprising a cover configured to be mounted on the housing member to enclose at least portions of the one or more circuit boards, wherein the cover is configured to be at least partially plugged into the host device.

11. The pluggable optical transceiver of claim 10, wherein the extended portion of the housing member is configured to be plugged into a cage in the host device, wherein the cover comprises protruded areas configured to come into contact with the cage to dissipate heat from the electric circuit to the host device.

12. The pluggable optical transceiver of claim 1, wherein the electric interface, one or more dimensions of the housing member and the cover are in compliance with a standard selected from the group consisting of Small Form Factor (SFF), Transceiver Multi-Source Agreement (MSA), Small Form-factor Pluggable (SFP), and Bi-directional Small Form-factor Pluggable (Bi-direction SFP).

13. The pluggable optical transceiver of claim 1, wherein the one or more circuit boards include a printed circuit board (PCB).

14. The pluggable optical transceiver of claim 1, wherein the one or more circuit boards include two PCBs connected by a flexible PCB.

15. The pluggable optical transceiver of claim 1, wherein the housing member is formed by Zinc die cast.

16. The pluggable optical transceiver of claim 1, wherein the extended portion in the housing member comprises a wall having a thickness at least 1 mm to conduct heat from the electric circuit.

17. A pluggable optical transceiver, comprising:
   a housing member comprising an extended portion configured to be plugged into a host device and an outer housing member configured to protrude out of the host device, wherein the housing member is formed by a unitary component;
   an optical module mounted to the housing member and configured to be coupled to an optical fiber, wherein the optical module is configured to receive a first optical signal from the optical fiber and transmit a second optical signal to the optical fiber in response to a first electric signal;

one or more circuit boards mounted to the housing member and electrically coupled to the optical module, the one or more circuit boards comprising an electronic circuit and an electric interface configured to be electrically connected to the host device, wherein the electric circuit is configured to receive the first electric signal from the host device via the electric interface, wherein the electric circuit is configured to send a second electric signal to host device via the electric interface in response to the first optical signal; and a thermal conductive layer positioned in contact with at least a portion of the electric circuit and the extended portion, wherein the thermal conductive layer is configured to conduct heat from the electric circuit to the extended portion.

18. The pluggable optical transceiver of claim 17, wherein the one or more circuit boards comprise an electronic component configured to generate heat in operation, wherein the thermal conductive layer positioned in contact the electronic component and the extended portion.

19. The pluggable optical transceiver of claim 18, wherein the electronic component includes an integrated circuit (IC).

20. The pluggable optical transceiver of claim 17, wherein the thermal conductive layer is formed by a thermally conductive adhesive material or a thermal conductive tape.

21. The pluggable optical transceiver of claim 17, wherein the outer portion of the housing member comprises protrusions or fins configured to dissipate heat conducted from the electric circuit into surrounding air.

22. The pluggable optical transceiver of claim 17, further comprising a cover configured to be mounted on the housing member to enclose at least portions of the one or more circuit boards, wherein the cover is configured to be at least partially plugged into the host device.

23. The pluggable optical transceiver of claim 22, wherein the extended portion of the housing member is configured to be plugged into a cage in the host device, wherein the cover comprises protruded areas configured to come into contact with the cage to dissipate heat from the electric circuit to the host device.

24. The pluggable optical transceiver of claim 17, wherein the electric interface, one or more dimensions of the housing member and the cover are in compliance with a standard selected from the group consisting of Small Form Factor (SFF), Transceiver Multi-Source Agreement (MSA), Small Form-factor Pluggable (SFP), and Bi-directional Small Form-factor Pluggable (Bi-direction SFP).

25. The pluggable optical transceiver of claim 17, wherein the one or more circuit boards include a first PCB, and a second PCB positioned on top of the first PCB, wherein the first PCB and the second PCB are connected by a flexible PCB, wherein the thermal conductive layer positioned between a portion of the second PCB and the extended portion.

26. A pluggable optical transceiver, comprising:
a housing member comprising an extended portion configured to be plugged into a host device and an outer housing member configured to protrude out of the host device, wherein the housing member is formed by a unitary component, wherein the outer portion of the housing member comprises protrusions or fins configured to dissipate heat conducted from the electric circuit into surrounding air;

an optical module mounted to the housing member and configured to be coupled to an optical fiber, wherein the optical module is configured to receive a first optical signal from the optical fiber and transmit a second optical signal to the optical fiber in response to a first electric signal;

one or more circuit boards mounted to the housing member and electrically coupled to the optical module, the one or more circuit boards comprising an electronic circuit and an electric interface configured to be electrically connected to the host device, wherein the electric circuit is configured to receive the first electric signal from the host device via the electric interface, wherein the electric circuit is configured to send a second electric signal to host device via the electric interface in response to the first optical signal, wherein the electric circuit comprises a heat-generating electronic component; and a thermal conductive layer positioned in contact with the heat-generating electronic component of the electric circuit and the extended portion, wherein the thermal conductive layer is configured to conduct heat from the electric circuit to the extended portion.

* * * * *